United States Patent
Bodtker et al.

(10) Patent No.: US 10,336,362 B2
(45) Date of Patent: Jul. 2, 2019

(54) ABSORPTION STRAP ASSEMBLY

(71) Applicant: STEERING SOLUTIONS IP HOLDING CORPORATION, Saginaw, MI (US)

(72) Inventors: Joen C. Bodtker, Gaines, MI (US); Randy W. Jones, North Branch, MI (US); Tyler Reno, Frankenmuth, MI (US); Cory A. Harris, Chesaning, MI (US)

(73) Assignee: STEERING SOLUTIONS IP HOLDNG CORPORATION, Saginaw, MI (US)

( * ) Notice: Subject to any disclaimer, the term of this patent is extended or adjusted under 35 U.S.C. 154(b) by 153 days.

(21) Appl. No.: 15/591,673

(22) Filed: May 10, 2017

(65) Prior Publication Data

US 2018/0327019 A1 Nov. 15, 2018

(51) Int. Cl.
*B62D 1/19* (2006.01)
*B62D 1/184* (2006.01)

(52) U.S. Cl.
CPC .............. *B62D 1/195* (2013.01); *B62D 1/184* (2013.01)

(58) Field of Classification Search
CPC ................................. B62D 1/195; B62D 1/184
See application file for complete search history.

(56) References Cited

U.S. PATENT DOCUMENTS

| | | | |
|---|---|---|---|
| 2007/0013180 A1* | 1/2007 | Stuedemann | B62D 1/184 280/775 |
| 2012/0125139 A1* | 5/2012 | Tinnin | B62D 1/184 74/493 |
| 2013/0042716 A1* | 2/2013 | Davies | B62D 1/195 74/493 |
| 2015/0375770 A1* | 12/2015 | Buzzard | B62D 1/184 74/493 |
| 2017/0050665 A1* | 2/2017 | Appleyard | B62D 1/192 |

\* cited by examiner

*Primary Examiner* — Darlene P Condra
(74) *Attorney, Agent, or Firm* — Cantor Colburn LLP

(57) ABSTRACT

An energy absorption strap assembly includes an energy absorption strap coupled to an upper jacket and positioned along an inner surface of a lower jacket of the steering column assembly, the energy absorption strap having a base extending along a longitudinal direction of the energy absorption strap. Also included is a rocker plate having a pivot region seated on the base of the energy absorption strap and tiltable thereon. Further included is a clamp assembly for fixing a telescoping position of the steering column assembly, the clamp assembly having a clamp jaw, wherein movement of the clamp jaw provides a meshed engagement between teeth of the clamp jaw and teeth of the rocker plate.

20 Claims, 4 Drawing Sheets

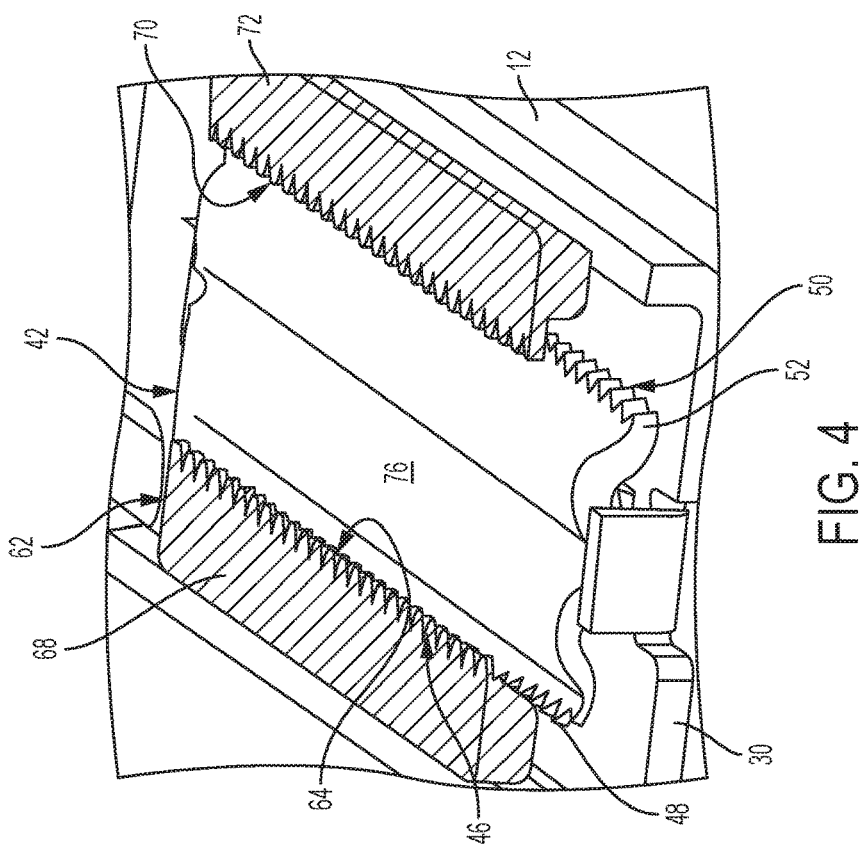
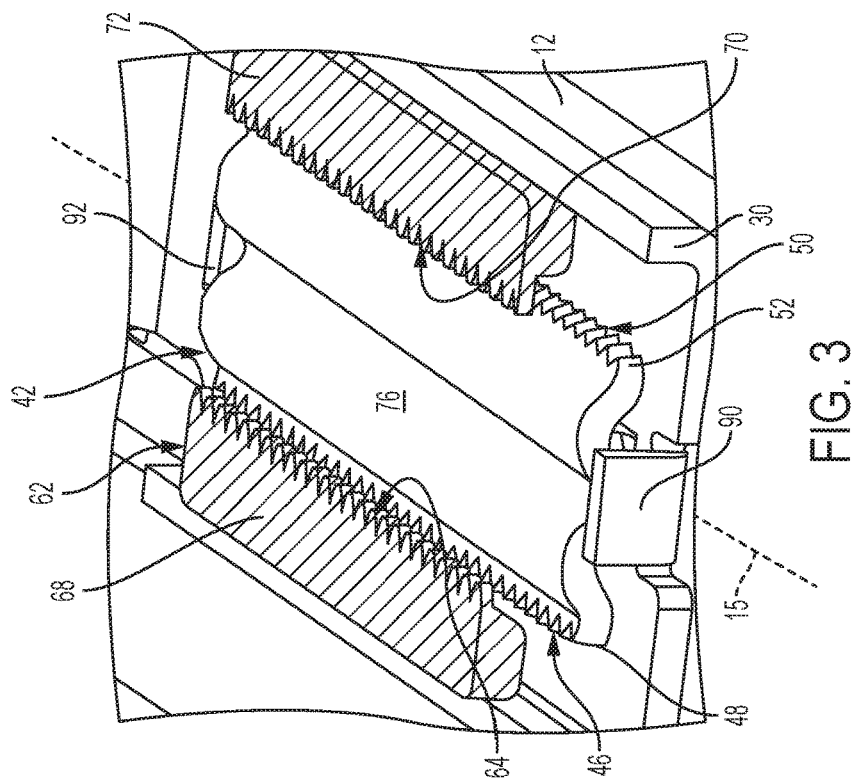

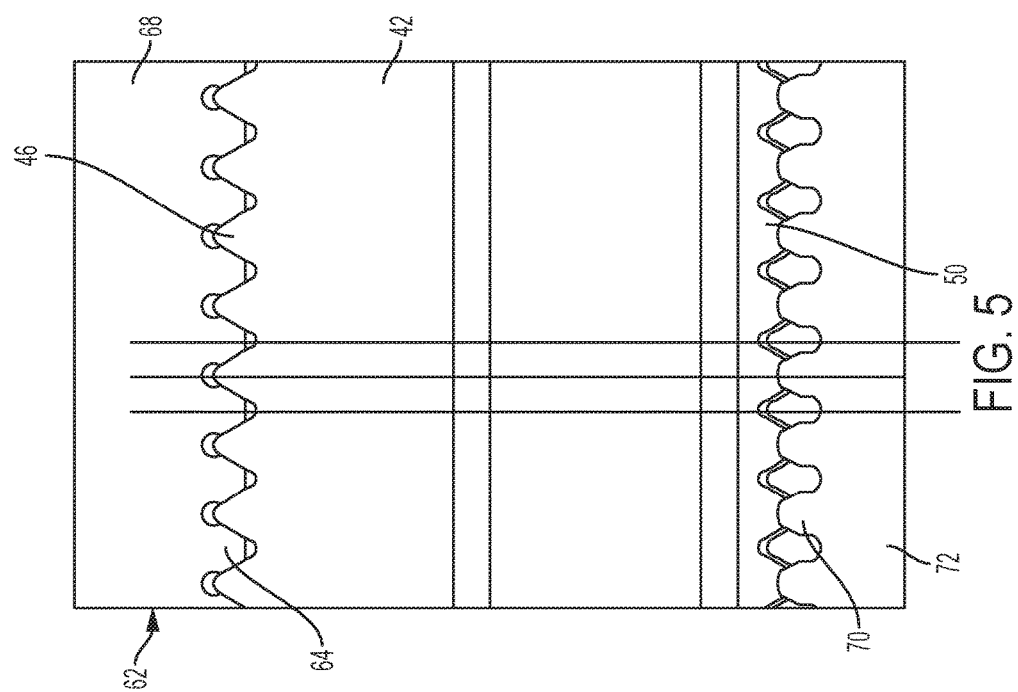

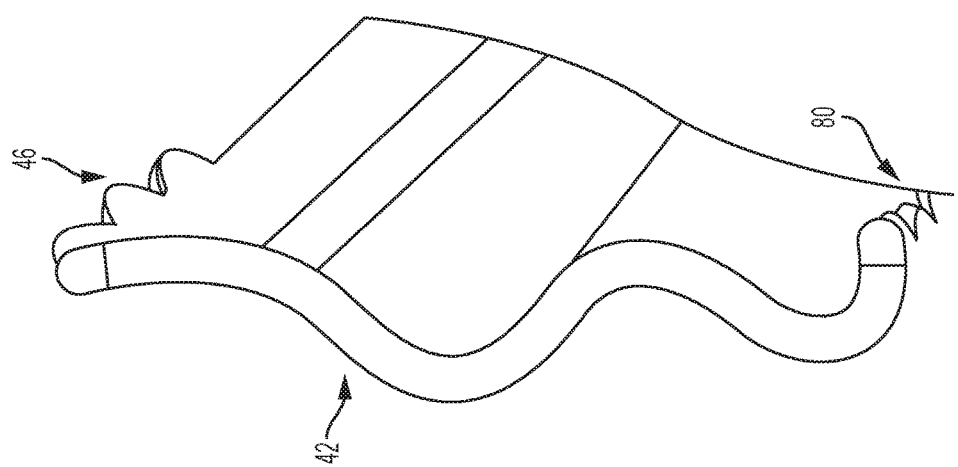

ABSORPTION STRAP ASSEMBLY

BACKGROUND

The embodiments described herein relate generally to steering columns and, more particularly, to an energy absorption strap assembly for steering columns.

On adjustable steering columns, it is desirable to clamp the moving pieces to secure their position for operating the vehicle. The clamping system is usually divided into two phases, namely adjustment lock and crashworthiness lock. It is common to have two separate systems of hardware to provide these functions.

Telescoping crashworthiness locking embodiments incorporate an eccentric toothed cam and strap. The locking strap is attached to the upper telescoping jacket and the eccentric cam accesses the strap through a large aperture in the lower jacket. The large slot structurally weakens the lower jacket and the jacket must be made heavier to compensate for the loss of strength. Additionally, more machining steps on the lower jacket are required. The weakened structural integrity is compensated for by adding many ribs and thicker walls, thereby adding mass to the part as well as the cost of more material. Furthermore, such eccentric based systems typically work in only one direction. A separate set of hardware is required to achieve bidirectional locking.

SUMMARY OF INVENTION

According to an aspect of the invention, an energy absorption strap assembly includes an energy absorption strap operatively coupled to an upper jacket of a steering column assembly and positioned along an inner surface of a lower jacket of the steering column assembly, the energy absorption strap having a base extending along a longitudinal direction of the energy absorption strap. Also included is a rocker plate having a pivot region seated on the base of the energy absorption strap, the rocker plate extending in a longitudinal direction of the steering column assembly and having a first row of rocker teeth disposed on a first side of the rocker plate and a second row of rocker teeth disposed on a second side of the rocker plate. Further included is a clamp assembly for fixing a telescoping position of the steering column assembly, the clamp assembly having a clamp jaw including a first row of clamp jaw teeth and a second row of clamp jaw teeth, wherein movement of the clamp jaw provides a meshed engagement of the first row of rocker teeth with the first row of clamp jaw teeth or meshed engagement of the second row of rocker teeth with the second row of clamp jaw teeth.

According to another aspect of the invention, a steering column assembly for a vehicle includes a lower jacket. Also included is an upper jacket in telescoping engagement with the lower jacket. Further included is an energy absorption strap mounted to the upper jacket and disposed along an inner surface of the lower jacket. Yet further included is a rocker plate operatively pivotably coupled to an inner surface of the energy absorption strap and fixed axially relative to the energy absorption strap, the rocker plate having a first row of rocker teeth disposed on a first side of the rocker plate and a second row of rocker teeth disposed on a second side of the rocker plate. Also included is a clamp assembly for fixing a telescoping position of the steering column assembly, the clamp assembly having a clamp jaw including a first row of clamp jaw teeth and a second row of clamp jaw teeth, the first row of rocker teeth and the second row of rocker teeth are staggered from each other or the first and second row of clamp jaw teeth staggered from each other, wherein movement of the clamp jaw provides a meshed engagement of the first row of rocker teeth with the first row of clamp jaw teeth or meshed engagement of the second row of rocker teeth with the second row of clamp jaw teeth.

According to yet another aspect of the invention, an energy absorption strap assembly includes an energy absorption strap coupled to an upper jacket and positioned along an inner surface of a lower jacket of the steering column assembly, the energy absorption strap having a base extending along a longitudinal direction of the energy absorption strap. Also included is a rocker plate having a pivot region seated on the base of the energy absorption strap and tiltable thereon. Further included is a clamp assembly for fixing a telescoping position of the steering column assembly, the clamp assembly having a clamp jaw, wherein movement of the clamp jaw provides a meshed engagement between teeth of the clamp jaw and teeth of the rocker plate.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a perspective view of the energy absorption strap assembly in the disengaged condition;

FIG. 4 is a perspective view of the energy absorption strap assembly in the engaged condition;

FIG. 5 is a view of the energy absorption strap assembly illustrating offset teeth of a rocker plate according to an aspect of the invention; and FIG. 6 is a perspective view of a rocker plate according to another aspect of the invention.

DETAILED DESCRIPTION

Referring now to the Figures, where the invention will be described with reference to specific embodiments, without limiting same, illustrated is an energy absorption strap assembly that provides reliable transitioning between an engaged condition and a disengaged condition of the EA strap.

Figure 1:
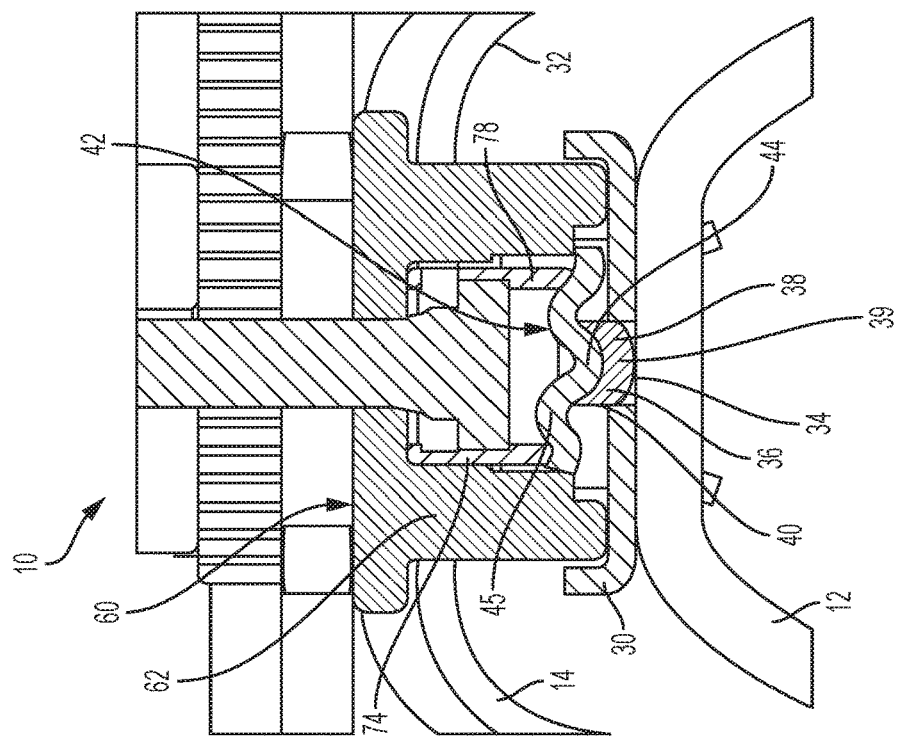
FIG. 1 is an end view of an energy absorption strap assembly in a disengaged condition.
Figure 2:
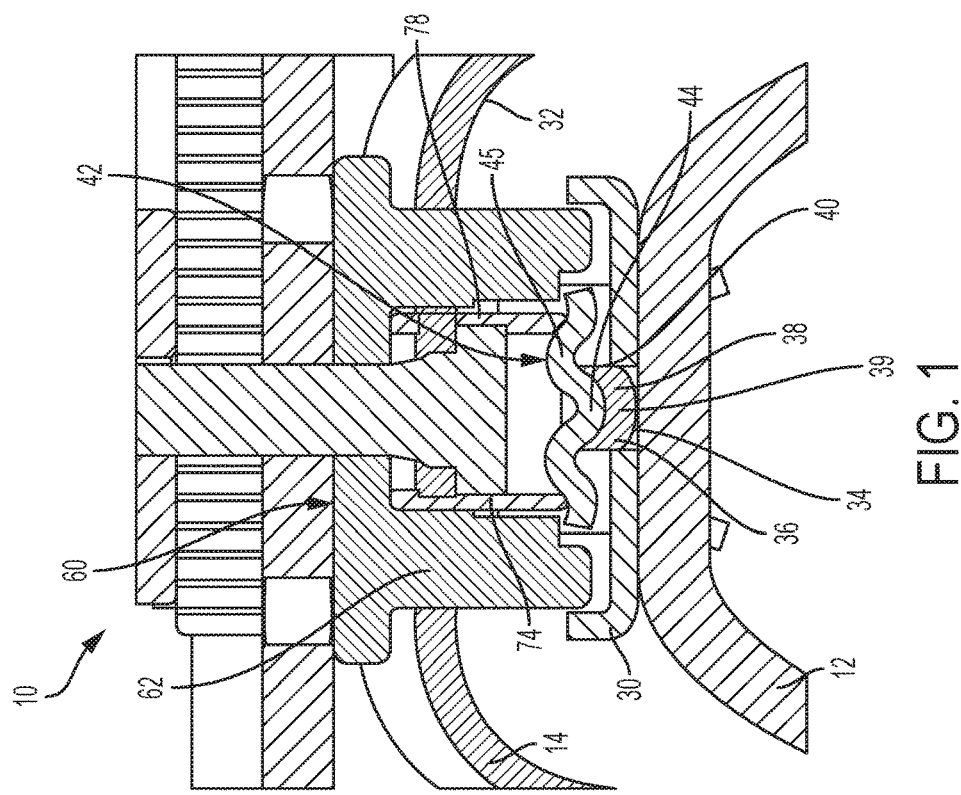
FIG. 2 is an end view of the energy absorption strap assembly in an engaged condition.

Referring now to FIGS. 1 and 2, a portion of a steering column assembly is illustrated and generally referenced with numeral 10. The steering column assembly 10 includes several components, including an upper jacket 12 and a lower jacket 14 that are telescopingly engaged with each other in an axial direction 15 (i.e., longitudinal direction of steering column) (FIG. 3). The steering column assembly 10 may be used in any type of vehicle that requires steering operation. Adjustment of the steering column assembly 10 may be facilitated by manipulation of an adjustment lever that is operatively coupled to the lower jacket 14. Actuation of the adjustment lever allows a user to switch the steering column between a locked condition and an unlocked condition. In the unlocked condition, a user is able to telescopingly adjust the upper jacket 12 relative to the lower jacket 14 to suit the user's preference. In the locked condition, relative movement of components of the steering column 10 is inhibited.

An energy absorption strap 30 ("EA strap" 30) absorbs energy during a collapse event of the steering column 10. The EA strap 30 is maintained in an engaged condition to absorb energy during a collapse event of the steering column assembly 10. The EA strap 30 may be positioned at any location around the steering column assembly 10, such as on sides of the column, as well as on an upper or lower portion of the column.

Referring now to FIGS. 1-4, the EA strap 30 is operatively coupled in any suitable manner to the upper jacket 12 and is positioned radially inwardly of the lower jacket 14. In particular, the EA strap 30 is located inwardly of an inner surface 32 of the lower jacket 14. The EA strap 30 extends in a longitudinal direction that coincides with the axial direction 15 that is the longitudinal direction of the steering column assembly 10. The EA strap 30 includes a base 34 that also extends in the axial direction 15. The base 34 is an elongated structure at least partially defined by a first wall 36 and a second wall 38. The first wall 36 and the second wall 38 extend from an intersecting location 39 to respective distal ends 40. The intersecting location 39 is closer to the upper jacket 12, when compared to distance between the distal ends 40 and the upper jacket 12. The walls 36, 38 are oriented at an acute angle relative to each other in some embodiments. In some embodiments, the walls 36, 38 form a substantially V-shaped inner wall surface at a cross section taken along an axial location of the base 34.

A rocker plate 42 is seated on the base 34 of the EA strap 30. The rocker plate 42 extends in a longitudinal direction that coincides with the axial direction 15 that is the longitudinal direction of the steering column assembly 10 and the EA strap 30. In the illustrated embodiment, the rocker plate 42 has multiple curved portions, forming what may be referred to as a "gullwing" geometry. In particular, the rocker plate 42 has a middle curved portion 44 and lateral curved portions 45. It is to be appreciated that the geometry of the rocker plate 42 may vary depending upon the particular application of use. The middle curved portion 44 is a pivot region of the rocker plate 42 and is the portion of the rocker plate 42 that is seated within the base 34 of the EA strap 30. Specifically, the curved surface of the middle curved portion 44 is at least partially seated between the first wall 36 and the second wall 38 of the base 34. The interface of the middle curved portion 44 and the base 34 allow the rocker plate 42 to pivot in a manner that facilitates tilting of the rocker plate 42 to either side of the base 34. Tilting occurs about a tilt axis that is located proximate the curved portion 44 of the rocker plate 42.

Referring to FIGS. 3 and 4, the EA strap 30 includes a first tab 90 and a second tab 92, each tab extending from the EA strap 30 toward the lower jacket 14. The tabs 90, 92 are positioned at respective ends of the rocker plate 42 to axially retain the rocker plate 42.

The rocker plate 42 includes a first row of rocker teeth 46 positioned on a first side 48 of the rocker plate 42 and a second row of rocker teeth 50 positioned on a second side 52 of the rocker plate 42. As shown in FIG. 5, the rows of rocker teeth 46, 50 are staggered from each other. Specifically, each row of teeth has teeth that are spaced from each other at a common pitch, as measured from tooth to tooth, but an offset of the rows of teeth relative to each other provides a staggered arrangement. For example, the first row of rocker teeth 46 may be offset from the second row of rocker teeth 50 by one-half of the pitch. However, it is contemplated that alternative staggered orientations would be suitable. Additionally, the rows of teeth 46, 50 have a common pitch in some embodiments, but it is to be appreciated that different pitches are present in some embodiments. Regardless of the commonality, or lack thereof, of pitch, the rows of teeth 46, 50 include at least some teeth that are staggered from each other, as described above.

The steering column assembly 10 also includes a clamping assembly 60 that restricts relative telescoping movement between the upper and lower jackets 12, 14. The clamping assembly 60 has a portion that protrudes through the lower jacket 14 and includes a clamp jaw 62 positioned between the upper jacket 12 and the lower jacket 14. The clamp jaw 62 includes a first row of clamp jaw teeth 64 located on a first side 68 of the clamp jaw 62 and a second row of clamp jaw teeth 70 located on a second side 72 of the clamp jaw 62. The first row of clamp jaw teeth 64 are positioned to overlap with the first row of rocker teeth 46 in a circumferential direction of the steering column assembly 10. Similarly, the second row of clamp jaw teeth 70 are positioned to overlap with the second row of rocker teeth 50 in a circumferential direction of the steering column assembly 10.

A first biasing component 74, such as a spring, is operatively coupled to the clamp jaw 62 at a first end of the component 74 and is in contact with an outer surface 76 of the rocker plate 42 on one side of the tilt axis of the rocker plate 42 that is defined by the middle curved portion 44 of the rocker plate 42. In some embodiments, the first biasing component 74 is in contact with the rocker plate 42 proximate the first row of rocker teeth 46 and at an engagement location of the first biasing component 74. In some embodiments, the engagement location may be a mid-spring location or a second end. Similarly, a second biasing component 78, such as a spring, is operatively coupled to the clamp jaw 62 at a first end of the component 78 and is in contact with an outer surface 76 of the rocker plate 42 on an opposite side of the tilt axis, relative to the contact location of the first biasing component 74. In some embodiments, the second biasing component 78 is in contact with the rocker plate 42 proximate the second row of rocker teeth 50 and at an engagement location of the second biasing component 78. In some embodiments, the engagement location may be a mid-spring location or a second end. Although described and illustrated with two biasing components, it is contemplated that a single biasing component may provide a sufficient biasing force. Contact of the biasing components 74, 78 with the rocker plate 42 bias the rocker plate 42 to an orientation that is parallel relative to the EA strap 30 when the rocker plate 42 and the clamp jaw 62 are in a disengaged condition. The rocker plate 42 and the clamp jaw 62 are shown in a disengaged condition in FIGS. 1 and 3. An engaged condition, or meshed condition, is shown in FIGS. 2 and 4. Movement between these conditions is described in detail herein.

In response to actuation of the clamping assembly 60, the clamp jaw 62 is restricted from moving axially in axial direction 15, but moves radially inwardly toward the EA strap 30. In doing so, the first row of clamp jaw teeth 64 move toward the first row of rocker teeth 46 and the second row of clamp jaw teeth 70 move toward the second row of rocker teeth 50. Due to the staggered orientation of the first row of rocker teeth 46 and the second row of rocker teeth 50, one of the rows of clamp jaw teeth will be out of sync with the rocker teeth that it is approaching. This may also be facilitated by staggering the clamp jaw teeth 64, 68 instead of the rocker teeth 46, 50. This will ensure a tooth-on-tooth interference between the clamp jaw 62 and the rocker plate 42 on one side of the assembly. The interference will not allow the teeth rows on that side of the assembly to mesh and will force the rocker plate 42 to tilt about its tilt axis to cause engagement of the opposite rows of teeth, thereby providing the meshed condition, or engaged condition shown in FIGS. 2 and 4. For example, the first row of clamp jaw teeth 64 may enter the interference with the first row of rocker teeth 46, thereby causing the second row of rocker teeth 50 to tilt radially outwardly and into engagement with the second row of clamp jaw teeth 70. The reverse situation may occur. At full engagement, the biasing component on the side of the row of teeth in interference with the clamp jaw teeth stays at nominal compression while the engaged side gets full compression. At the point of engagement, one of the biasing components 74, 78 will be at nominal compression on the interference side and the other biasing component will be at full compression. The force in the clamp jaw 62 is sufficient to overcome this biasing load. Once engagement between one side of rows of teeth have been achieved, the clamp jaw 62 will advance until it bottoms on the EA strap 30 against the side of the upper jacket 12. This will delash the entire steering column assembly 10.

To assure that the meshing side of teeth does not experience interference of teeth, the teeth on the rocker plate have been staged at a "gull wing angle" to cause only a point contact of the tooth into the engagement plane at the onset of meshing. Furthermore, the teeth are placed below center about the axis of rotation. The teeth are nominally positioned in a loose mesh condition. As the rocker plate 42 tilts, the teeth approach a tight mesh condition, thereby reducing lash and increasing axial hold. Additionally, the teeth on the clamp jaw 62 are chamfered to create a larger effective space width in which the rocker plate tooth tips may locate.

When unclamping the assembly with the clamping assembly 60, the distance between the clamp jaw 62 and the EA strap 30 is increased. The biasing components 74, 78 keep the rocker plate 42 seated in the base 34, ensuring that the lock teeth fully disengage to provide the disengaged condition shown in FIGS. 1 and 3.

In the engaged condition, when an energy generating event occurs, the upper jacket 12 will be forced to slide forward in the vehicle while the clamp jaw 62 remains stationary. The relative motion of the upper jacket 12 to the clamp jaw 62 will be transferred to the rocker plate 42 by the first and second tabs 90, 92 of the EA strap 30.

The embodiments illustrated in FIGS. 1-5 show the rocker plate 42 having rows of teeth that are oriented substantially parallel to each other. However, in some embodiments the rocker plate 42 has rows of teeth that are oriented substantially perpendicular to each other, as shown in FIG. 6. With this geometrical setup of FIG. 6, there is less probability for a second row of rocker teeth 80 to encounter a tooth-on-tooth scenario, as the only positional location for this to happen will occur when the other row of rocker teeth 46 is perfectly in line with its mating teeth on the clamp jaw 62. The change in tooth locking angle on just one side of the rocker plate 42 allows for more tolerance which makes it more likely to achieve positive lock every time without the potential for a tooth-on-tooth scenario. One of the biasing components 74, 78 may be removed to reduce cost in the embodiment of FIG. 6.

All of the embodiments described herein provide positive locking for the extension and retraction directions (telescoping) of the column assembly 10. The clamping components associated with the EA strap 30 are located internally relative to the lower jacket 14, thereby adding structural integrity in the lower jacket since an aperture therethrough is not necessary.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. An energy absorption strap assembly comprising:
   an energy absorption strap operatively coupled to an upper jacket of a steering column assembly and positioned along an inner surface of a lower jacket of the steering column assembly, the energy absorption strap having a base extending along a longitudinal direction of the energy absorption strap;
   a rocker plate having a pivot region seated on the base of the energy absorption strap, the rocker plate extending in a longitudinal direction of the steering column assembly and having a first row of rocker teeth disposed on a first side of the rocker plate and a second row of rocker teeth disposed on a second side of the rocker plate; and
   a clamp assembly for fixing a telescoping position of the steering column assembly, the clamp assembly having a clamp jaw including a first row of clamp jaw teeth and a second row of clamp jaw teeth, wherein movement of the clamp jaw provides a meshed engagement of the first row of rocker teeth with the first row of clamp jaw teeth or meshed engagement of the second row of rocker teeth with the second row of clamp jaw teeth.

2. The assembly of claim 1, wherein the first row of clamp jaw teeth and the second row of clamp jaw teeth are oriented parallel to each other.

3. The assembly of claim 1, wherein the first row of clamp jaw teeth and the second row of clamp jaw teeth are oriented perpendicular to each other.

4. The assembly of claim 1, wherein the first row of rocker teeth and the second row of rocker teeth are staggered relative to each other or the first row of clamp jaw teeth and the second row of clamp jaw teeth are staggered relative to each other.

5. The assembly of claim 4, wherein the first row of clamp jaw teeth are separated by a pitch length and the second row of clamp jaw teeth are separated by the pitch length, the first and second row of clamp jaw teeth staggered by one-half of the pitch length.

6. The assembly of claim 1, wherein the base comprises two walls forming an acute angle.

7. The assembly of claim 6, wherein the pivot region comprises a curved portion seated within the base.

8. The assembly of claim 1, further comprising a first spring and a second spring coupled to the clamp jaw at respective first spring ends and in contact with the rocker plate at respective engagement locations spaced from the respective first spring ends.

9. The assembly of claim 8, wherein the first spring is in contact with the rocker plate proximate the first row of rocker teeth and the second spring is in contact with the rocker plate proximate the second row of rocker teeth.

10. The assembly of claim 8, wherein the first and second spring bias the rocker plate to an orientation parallel relative to the energy absorption strap in a disengaged condition of the clamp jaw and the rocker plate.

11. The assembly of claim 1, wherein the energy absorption strap includes a first tab and a second tab to axially retain the rocker plate.

12. A steering column assembly comprising:
a lower jacket;
an upper jacket in telescoping engagement with the lower jacket;
an energy absorption strap mounted to the upper jacket and disposed along an inner surface of the lower jacket;
a rocker plate operatively pivotably coupled to an inner surface of the energy absorption strap and fixed axially relative to the energy absorption strap, the rocker plate having a first row of rocker teeth disposed on a first side of the rocker plate and a second row of rocker teeth disposed on a second side of the rocker plate; and
a clamp assembly for fixing a telescoping position of the steering column assembly, the clamp assembly having a clamp jaw including a first row of clamp jaw teeth and a second row of clamp jaw teeth, the first row of rocker teeth and the second row of rocker teeth are staggered from each other or the first and second row of clamp jaw teeth staggered from each other, wherein movement of the clamp jaw provides a meshed engagement of the first row of rocker teeth with the first row of clamp jaw teeth or meshed engagement of the second row of rocker teeth with the second row of clamp jaw teeth.

13. The assembly of claim 12, wherein the first row of clamp jaw teeth and the second row of clamp jaw teeth are oriented parallel to each other.

14. The assembly of claim 12, wherein the first row of clamp jaw teeth and the second row of clamp jaw teeth are oriented perpendicular to each other.

15. The assembly of claim 12, wherein the first row of clamp jaw teeth are separated by a pitch length and the second row of clamp jaw teeth are separated by the pitch length, the first and second row of clamp jaw teeth staggered by one-half of the pitch length.

16. The assembly of claim 12, wherein the base comprises two walls forming an acute angle.

17. The assembly of claim 16, wherein the pivot region comprises a curved portion seated within the base.

18. The assembly of claim 12, further comprising a first spring and a second spring coupled to the clamp jaw at respective first spring ends and in contact with the rocker plate at respective engagement locations spaced from the respective first spring ends.

19. The assembly of claim 18, wherein the first spring is in contact with the rocker plate proximate the first row of rocker teeth and the second spring is in contact with the rocker plate proximate the second row of rocker teeth, the first and second spring biasing the rocker plate to an orientation parallel relative to the energy absorption strap in a disengaged condition of the clamp jaw and the rocker plate.

20. An energy absorption strap assembly comprising:
an energy absorption strap coupled to an upper jacket and positioned along an inner surface of a lower jacket of the steering column assembly, the energy absorption strap having a base extending along a longitudinal direction of the energy absorption strap;
a rocker plate having a pivot region seated on the base of the energy absorption strap and tiltable thereon; and
a clamp assembly for fixing a telescoping position of the steering column assembly, the clamp assembly having a clamp jaw, wherein movement of the clamp jaw provides a meshed engagement between teeth of the clamp jaw and teeth of the rocker plate.

* * * * *